United States Patent

[11] 3,547,325

| [72] | Inventors | Robert B. Hill<br>2101 S. Nevada St., Oceanside, Calif. 92054;<br>Stephen W. Palmer, 666 Alto Vista Drive, Vista, Calif. 92083 |
|---|---|---|
| [21] | Appl. No. | 751,531 |
| [22] | Filed | Aug. 9, 1968 |
| [45] | Patented | Dec. 15, 1970 |

[54] BICYCLE SURFBOARD RACK
1 Claim, 7 Drawing Figs.

| [52] | U.S. Cl. | 224/39 |
|---|---|---|
| [51] | Int. Cl. | B62j 11/00 |
| [50] | Field of Search | 224/30—41, 42.1E, 42.1 |

[56] References Cited
UNITED STATES PATENTS

| 3,329,323 | 7/1967 | Tanaka | 224/41 |
|---|---|---|---|
| 3,338,484 | 8/1967 | Hall, Sr. | 224/41 |

FOREIGN PATENTS

| 1,169,695 | 9/1958 | France | 224/42.1E |

*Primary Examiner*—Gerald M. Forlenza
*Attorney*—Herbert C. Schulze

ABSTRACT: This is a rack for detachable attachment to a customary bicycle for the purpose of carrying a surfboard over the head of the bicycle rider.

The rack is formed of tubing or the like which fastens to the rear axle of the bicycle and to the front steering yoke. It is formed of tubing with appropriate straps and configuration to hold the surfboard in place while being transported.

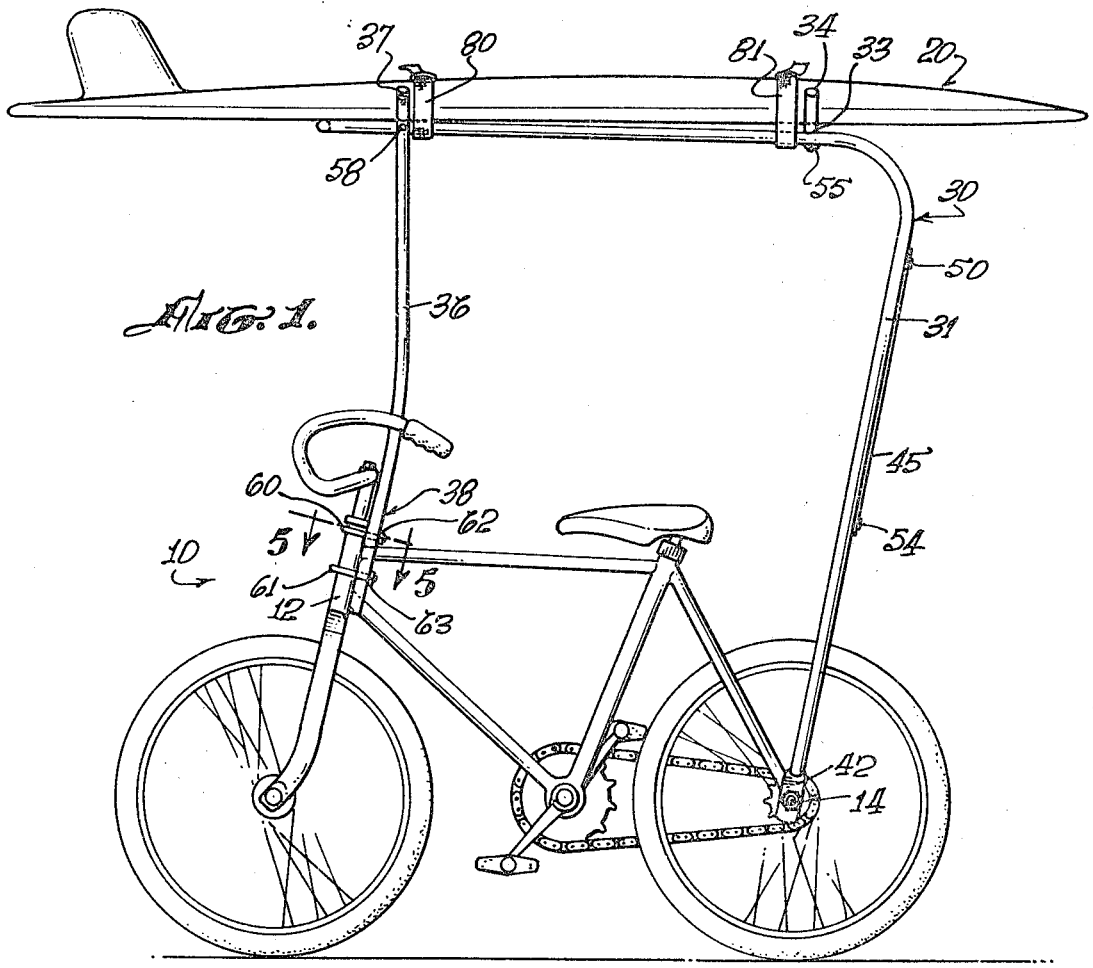
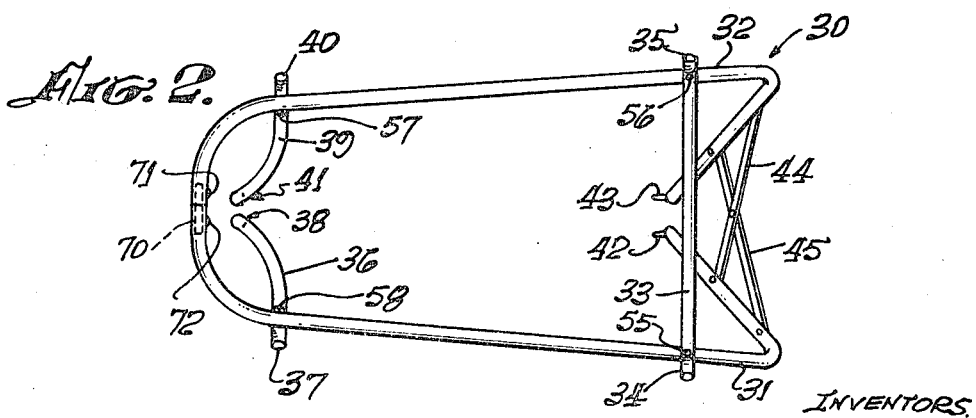

PATENTED DEC 15 1970
3,547,325
SHEET 2 OF 2
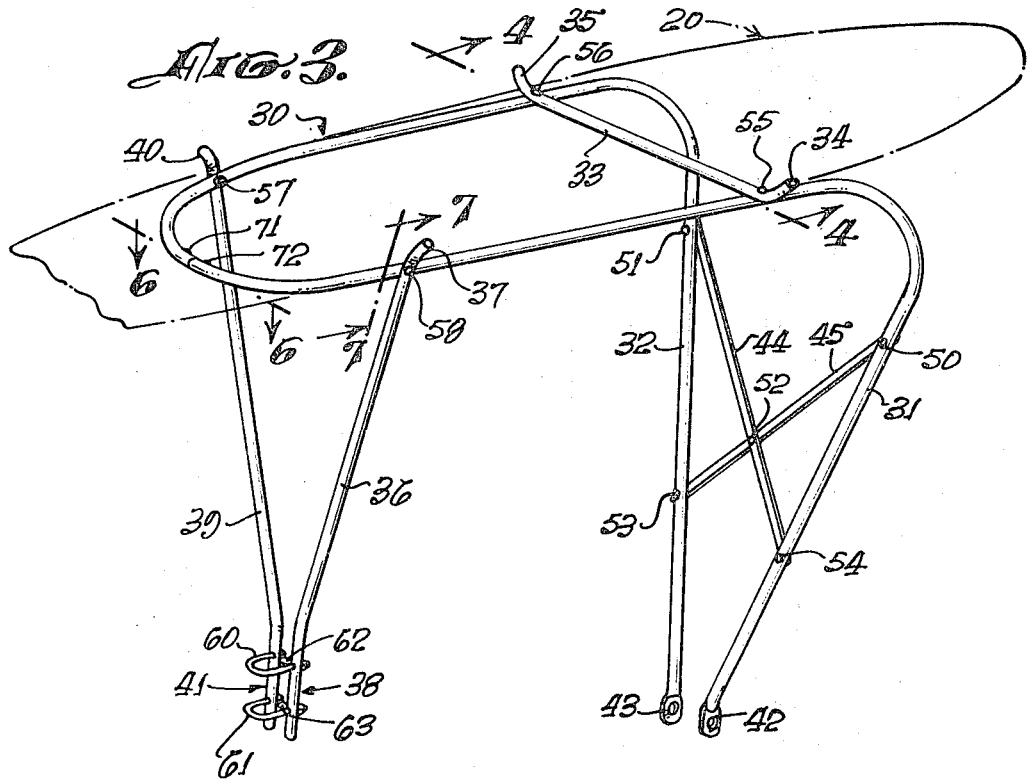
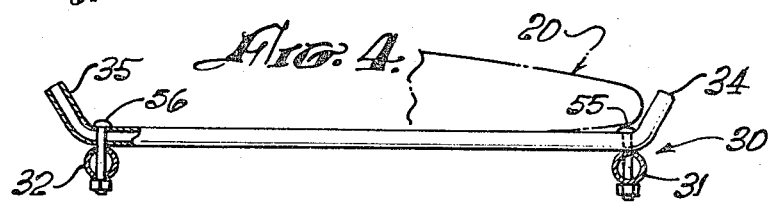
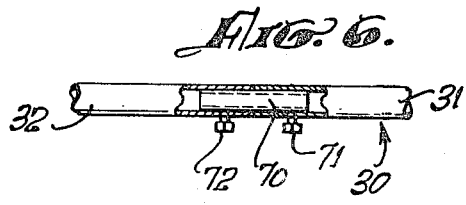
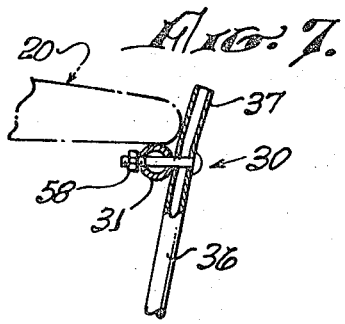
INVENTORS.
ROBERT B. HILL,
STEPHEN W. PALMER,
By
Herbert C. Schulze
ATTORNEY

3,547,325

BICYCLE SURFBOARD RACK

BACKGROUND OF THE INVENTION

1. Field of the Invention

This is in the general field of carrying racks for bicycles and particularly in the field of a rack designed for carrying a surfboard with minimum interference with rideability and safety of the bicyclist.

2. Description of the Prior Art

There is no prior art that we know of related to this invention. We are familiar with trailers that are used behind bicycles for this purpose, but we have no knowledge of any device which is capable of carrying a surfboard over the head of a bicycle ridge and which device is easily mounted or removed from the bicycle.

SUMMARY

It is quite customary along the coastal areas, and particularly along the west coast area of the United States, that young people who normally use bicycles as a mode of transportation also own and use surfboards for surfing along the coastal beaches.

A surfboard is normally quite long, being in the neighborhood of 10 feet frequently; it is a cumbersome and somewhat heavy article to transport. Until now the only means known by which a bicyclist has been able to transport a surfboard has been by a trailer like arrangement on the rear of his bicycle. There are many difficulties with such arrangements since they create a traffic hazard and frequently the board may be damaged by obstructions when going around a corner and the like.

We have devised a rack which fastens to the bicycle and which provides storage for a surfboard directly over the head of the person riding the bicycle. This rack is so constructed that the surfboard is balanced with relation to the length of the bicycle and therefore the riding characteristics of the bicycle are not materially changed.

The rack is further so designed that it clamps onto the front yoke of the bicycle and there are two fastening positions which fasten to the rear axle of the bicycle It is possible to install the unit on a bicycle and to remove it in a matter of a few moments.

Additionally, the rack is so made that it can be broken down into a very compact package for storage or for transporting by automobile or the like.

It is an object of this invention to provide a rack for safely carrying a surfboard on a bicycle;

It is a further object of this invention to provide such a rack which is easily mounted on, or removed from, a bicycle;

It is a further object of this invention to provide such a rack which can be stored in a small space.

The foregoing and other objects and advantages of this invention will be clear to those skilled in the art upon reading the specification which follows in conjunction with the drawings.

BRIEF DESCRIPTION OF THE DRAWINGS

FIG. 1 is a side elevation of a bicycle with a preferred embodiment of this invention in place thereon and a surfboard mounted on the said preferred embodiment;

FIG. 2 is a top plan of the embodiment shown in FIG. 1 removed from the bicycle and with the surfboard and fastening straps removed;

FIG. 3 is a perspective of the embodiment of this invention shown in FIG. 1 and FIG. 2 removed from the bicycle and without the surfboard or fastening straps;

FIG. 4 is a section through 4–4 of FIG. 3 with one small portion further broken away to show further partial section;

FIG. 5 is a section through 5–5 on FIG. 1;

FIG. 6 is a section on 6–6 of FIG. 3; and

FIG. 7 is a section on 7–7 of FIG. 3.

DESCRIPTION OF A PREFERRED EMBODIMENT

It will be seen that this device comprises a basically tubular rack fastened together with bolts and the like which is quickly attached to and removed from a bicycle. The unit is further formed in several individual sections so that it is easily and quickly disassembled completely if desired.

FIG. 1 illustrates generally a bicycle 10 having a front-steering yoke arrangement 12 and a rear axle arrangement of customary nature 14. The rack generally 30 is mounted thereon and a surfboard generally 20 is shown fastened by two straps 80 and 81 made of canvas, leather, rubber, or the like.

It will be observed particularly from FIG. 3 that the rack comprises two basic frame members 31 and 32 of the configuration shown and joined at the front thereof by the insertion of a sleeve 70 into the two tubular members 31 and 32 said sleeve 70 being fastened to 31 and 32 by sheet metal screws 72 and 71 respectively.

The members 32 and 31 are also each fastened to tubular rack member 33 having flared and upwardly extending ends 34 and 35. These are fastened appropriately by bolts or the like 56 and 55.

Bracing 44 and 45 is provided as indicated being bolted together at 52 and in turn being bolted to racks 31 and 32 by the bolts 50, 51, 53 and 54 as indicated. The rack member 31 has one end flattened and slightly bent as shown in 42 and the rack member 32 is similarly arranged as indicated at 43. These two flattened ends each have a hole suitable to accommodate the axle of the bicycle.

In use, the nuts on the end of the axle as indicated at 14 are removed and the tabs 42 and 43 slipped over the axle; the nuts are then replaced to hold this rack in position.

At the front of the rack there are two members 36 and 39 having upwardly and outwardly flaring ends 37 and 40 respectively and fastened by bolts 58 and 57 respectively to 31 and 32. The lower ends of the members 36 and 39 are straightened as shown at 38 and 41 and then depend essentially straight downward for a short distance. These two members have holes to accommodate two sets of U bolts 60 and 61 as indicated. The U bolts are so disposed as so to be clamped around the portion of the frame of the bicycle as indicated at 12 and as shown particularly well in FIGS. 1 and 5. A plate 62 and a plate 63 are used in back of the members 36 and 39 as shown and nuts are fastened over the ends of the U bolt as well illustrated in FIG. 5 to hold the entire unit in a close relationship with the portion 12 of the bicycle.

In use these units can be mounted or dismounted from a bicycle in a matter of moments by merely removing the nuts from the two U bolts 60 and 61 and removing the two nuts on the end of the axle 14 and appropriately fastening or removing the rack 30. When it is desired to store the unit the major members can be dismounted from one another and the entire unit will store in a very small area and in a relatively flat and compact package as will be clear to those skilled in the art.

It will be clear to those skilled in the art, and particularly by examining FIGS. 1, 5 and 3, that the unique arrangement of members 36 and 39 and the positioning and means of attachment by U bolts 60 and 61 allow the mounting of this rack in an entirely new manner as compared to any prior art in such fashion that there is no interference with the normal steering of a bicycle which would in any manner impair the rideability under normal circumstances. The members 36 and 39 have been deliberately so shaped that at their ends where they are attached to the bicycle, they are essentially vertically disposed in a very close relationship to one another, as shown particularly well in FIG. 3, with a flaring effect above the bicycle to attach to the upper portion of the frame.

The U bolts 60 and 61 are fastened about the exterior portion 12 of the handlebar-mounting arrangement. Thus the handlebars operate in the normal manner through a shaft through the mounting sleeve 12, which supports the front bicycle-steering yoke, which is mounted to the bicycle wheel as indicated in the illustration and as is well known in the art.

The handlebars then pivot in such manner that they pivot about the supports 36 and 39 and are not of great problem.

The bolts being around the exterior of the member which forms the bushing for the steering device do not interfere therewith and the braces 36 and 39 being flared as shown are, at the lower end, in such configuration as to allow the pivoting of the handlebars as heretofore set forth and will be clear to those who have ridden bicycles and are familiar with the configuration of bicycle handlebars.

While the embodiment of this invention shown and described is fully capable of achieving the objects and advantages desired, many modifications will be clear to those skilled in the art without departing from the inventive concepts disclosed herein. It is not our intention to be limited by the specific embodiment shown which is for illustrative purposes only.

We claim:
1. A surfboard rack for a bicycle comprising a first frame portion having means to fasten upon the rear axle of a bicycle; a second frame portion having means adaptable to fasten upon the rear axle of the bicycle; means joining said first and second frame portions at their front parts; a pair of frame members adapted to fasten at one end thereof, on alternate sides of, and to the rear of the center of, the front-steering yoke-mounting sleeve of a bicycle so as to be clear of the steering mechanism actuated by the handlebars of the bicycle, in which the said front frame members are parallel to the steering yoke-mounting sleeve at their point of juncture thereto and are bent at an elevation from said steering yoke in such manner as to flare outward to join said means to hold a surfboard in place.